(12) United States Patent
Shi et al.

(10) Patent No.: US 8,744,440 B2
(45) Date of Patent: Jun. 3, 2014

(54) METHOD AND APPARATUS FOR SCANNING BASE STATIONS

(75) Inventors: Guangming Shi, San Diego, CA (US);
Fangqi Hu, San Diego, CA (US); Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/284,708

(22) Filed: Oct. 28, 2011

(65) Prior Publication Data

US 2013/0109379 A1 May 2, 2013

(51) Int. Cl.
*H04W 4/00* (2009.01)

(52) U.S. Cl.
USPC .......................................... 455/434

(58) Field of Classification Search
USPC .......................................... 455/434
See application file for complete search history.

(56) References Cited

U.S. PATENT DOCUMENTS

| | | | |
|---|---|---|---|
| 2005/0060319 A1* | 3/2005 | Douglas et al. | 707/10 |
| 2009/0103503 A1* | 4/2009 | Chhabra | 370/338 |
| 2009/0124258 A1 | 5/2009 | Jeon | |
| 2009/0278705 A1 | 11/2009 | Chhabra et al. | |
| 2010/0003986 A1* | 1/2010 | Chen | 455/436 |
| 2010/0113021 A1 | 5/2010 | Vare et al. | |
| 2010/0208700 A1 | 8/2010 | Shi et al. | |
| 2010/0234021 A1 | 9/2010 | Ngai et al. | |

FOREIGN PATENT DOCUMENTS

EP 1919242 A2 5/2008

OTHER PUBLICATIONS

International Search Report and Written Opinion—PCT/US2012/059368—ISA/EPO—Jan. 18, 2013.

\* cited by examiner

*Primary Examiner* — Temica M Beamer
*Assistant Examiner* — Joel Ajayi
(74) *Attorney, Agent, or Firm* — Tyler J. Overall (57) ABSTRACT

Methods and apparatuses are provided for scanning base stations in wireless communications. The base stations can be scanned in order of distance from a device or a corresponding reference point so that base stations of a shortest distance are measured before those of a longer distance. In addition, scanning of base stations can be ceased according to one or more stopping criteria to improve efficiency of scanning.

30 Claims, 8 Drawing Sheets

METHOD AND APPARATUS FOR SCANNING BASE STATIONS

BACKGROUND

1. Field

The following description relates generally to wireless network communications, and more particularly to measuring surrounding base stations.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ...). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as Worldwide Interoperability for Microwave Access (WiMAX, IEEE 802.16), third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

In addition, in some wireless communication technologies, such as WiMAX, LTE, etc., devices can scan for signals from base stations other than a source or serving base station to determine when communications are improved at the other base stations (e.g., for the purpose of mobility). Resources for scanning, in this example, are negotiated with the serving base station such that the serving base station does not attempt to communicate with the device during scan intervals. The time used by a wireless device for scanning can depend on the number of base stations scanned and/or distances thereto.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with scanning base stations for mobility or other purposes based in part on a location of the base stations. For example, the base stations can be prioritized or otherwise ordered according to a distance to the base stations from a reference point (e.g., base stations of a shorter distance from the reference point can be ranked highest), and scanned in order such that the closest base station is scanned first, and so on. In addition, scanning can be limited to conserve time and resources, and/or to comply with an assigned scanning interval; thus, scanning closer base stations first can result in more effective scanning, since mobility would more likely occur with a closer base station.

According to an example, a method for measuring base stations in wireless communications is provided. The method includes determining distances from a serving base station to a plurality of other base stations and prioritizing the plurality of other base stations in a scanning list based at least in part on the distances. The method also includes scanning at least a portion of the plurality of other base stations for mobility based at least in part on the scanning list.

In another aspect, an apparatus for measuring base stations in wireless communications is provided. The apparatus includes at least one processor configured to determine distances from a serving base station to a plurality of other base stations and prioritize the plurality of other base stations in a scanning list based at least in part on the distances. The at least one processor is further configured to scan at least a portion of the plurality of other base stations for mobility based at least in part on the scanning list. The apparatus also includes a memory coupled to the at least one processor.

In yet another aspect, an apparatus for measuring base stations in wireless communications is provided. The apparatus includes means for determining distances from a serving base station to a plurality of other base stations and means for prioritizing the plurality of other base stations in a scanning list based at least in part on the distances. The apparatus further includes means for scanning at least a portion of the plurality of other base stations for mobility based at least in part on the scanning list.

Still, in another aspect, a computer-program product is provided including a non-transitory computer-readable medium having code for causing at least one computer to determine distances from a serving base station to a plurality of other base stations and code for causing the at least one computer to prioritize the plurality of other base stations in a scanning list based at least in part on the distances. The computer-readable medium further includes code for causing the at least one computer to scan at least a portion of the plurality of other base stations for mobility based at least in part on the scanning list.

Moreover, in an aspect, an apparatus for measuring base stations in wireless communications is provided that includes a base station location determining component for determining distances from a serving base station to a plurality of other base stations and a base station prioritizing component for prioritizing the plurality of other base stations in a scanning list based at least in part on the distances. The apparatus further includes a base station scanning component for scanning at least a portion of the plurality of other base stations for mobility based at least in part on the scanning list.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, a device can determine a priority or other order for scanning surrounding base stations (BS) or related cells based on a location thereof. For example, the device can determine a location of one or more surrounding BSs, compare the location to that of the device, and accordingly prioritize or order the one or more surrounding BSs based on location. For example, the device can determine a distance to the one or more surrounding BSs based on a location of the device or another reference point. The device can scan signals from the BSs in a scanning interval using the order such that a BS having a smallest distance from the device or the reference point (e.g., the closest BS) is scanned first.

Moreover, the device can scan BSs until one or more stopping criteria are encountered. For example, the stopping criteria can include determining a BS at a threshold distance is encountered, where the threshold can be set such that BSs beyond the threshold distance are unlikely candidates for mobility. In another example, the stopping criteria can include determining a number of BSs having relative marginal signal strength over that of a serving BS have been scanned. In yet another example, the stopping criteria can include determining a number of BSs having a signal strength below a threshold level have been scanned. In any case, using location or distance in determining a scanning order for surrounding BSs can improve the scanning process since BSs that are the more likely candidates for mobility can be scanned first. Thus, scanning can utilize less time since signals can be received sooner, and in addition, BSs that are not likely candidates (e.g., BSs over a threshold distance from the device) are not be scanned where a scanning interval is limited.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Figure 1:
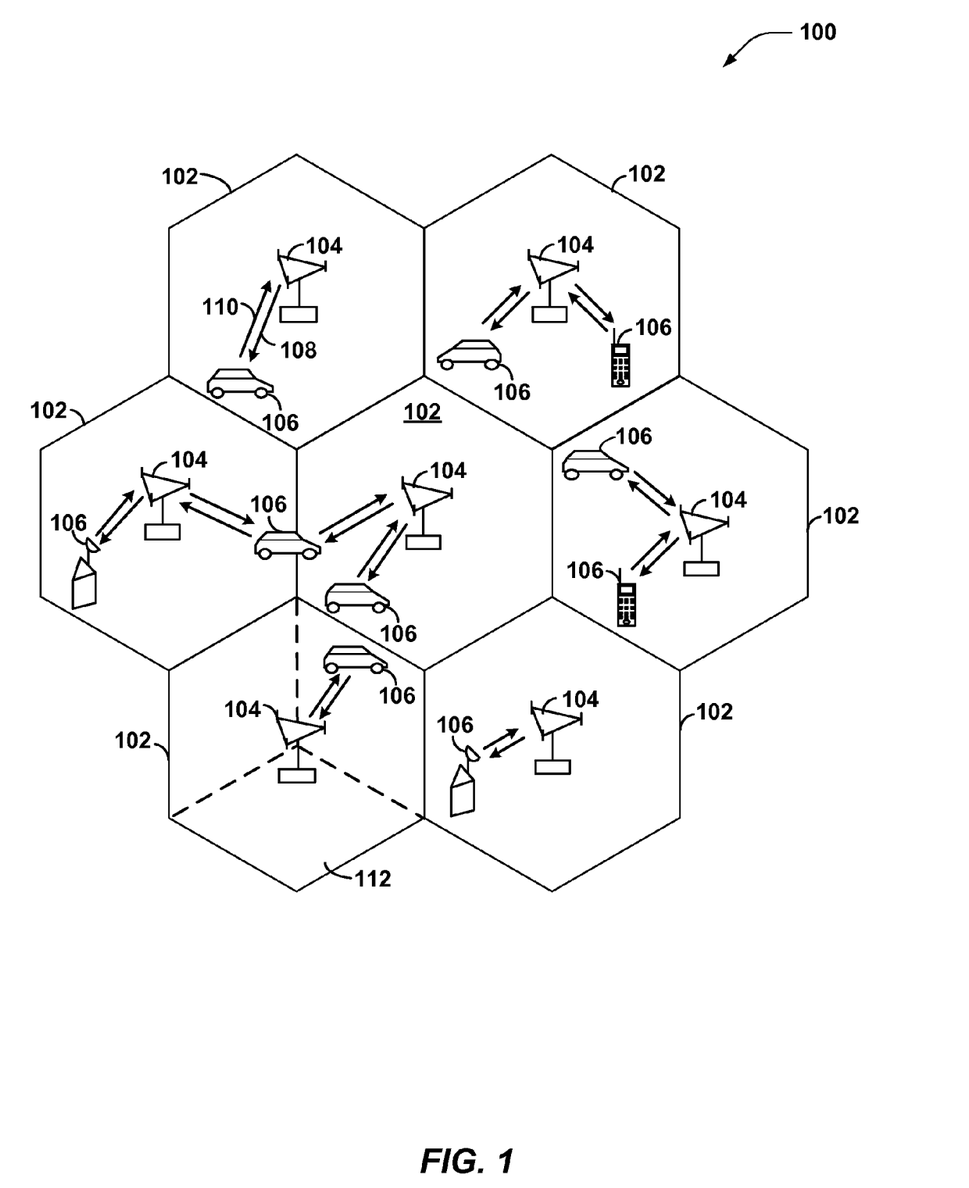
FIG. 1 illustrates an example wireless communication system in accordance with certain embodiments described herein.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a BS 104. A BS 104 may be a fixed station that communicates with user terminals 106. The BS 104 may alternatively be referred to as an access point, a Node B, eNB, or some other terminology.

FIG. 1 depicts various user terminals 106 dispersed throughout the system 100. The user terminals 106 may be fixed (e.g., stationary) or mobile. The user terminals 106 may alternatively be referred to as remote stations, access terminals, terminals, subscriber units, mobile stations, stations, user equipment (UE), etc. The user terminals 106 may be wireless devices, such as cellular phones, personal digital assistants (PDAs), handheld devices, wireless modems, laptop computers, personal computers, a portion thereof, etc.

A variety of algorithms and methods may be used for transmissions in the wireless communication system 100 between the BSs 104 and the user terminals 106. For example, signals may be sent and received between the BSs 104 and the user terminals 106 in accordance with OFDM/OFDMA techniques. If this is the case, the wireless communication system 100 may be referred to as an OFDM/OFDMA system.

A communication link that facilitates transmission from a BS 104 to a user terminal 106 may be referred to as a downlink 108, and a communication link that facilitates transmission from a user terminal 106 to a BS 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. BSs 104 within a wireless communication system 100 may utilize antennas that concentrate the flow of power within a particular sector 112 of the cell 102. Such antennas may be referred to as directional antennas.

Figure 2:
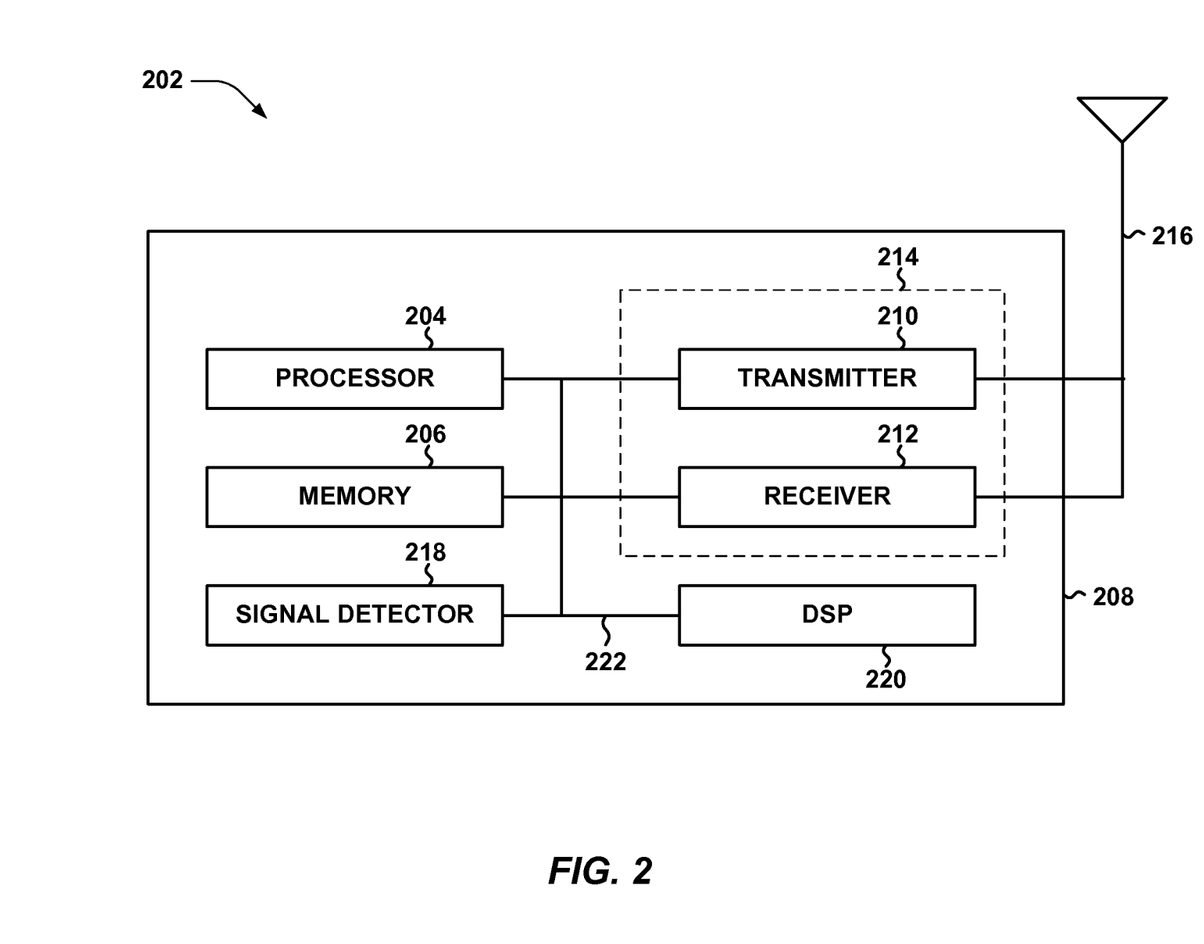
FIG. 2 illustrates various components that can be utilized in a wireless device in accordance with certain embodiments described herein.

FIG. 2 illustrates various components that may be utilized in a wireless device 202 that may be employed within the wireless communication system 100. The wireless device 202 is an example of a device that may be configured to implement the various methods described herein. The wireless device 202 may be a BS 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas to facilitate MIMO communications.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
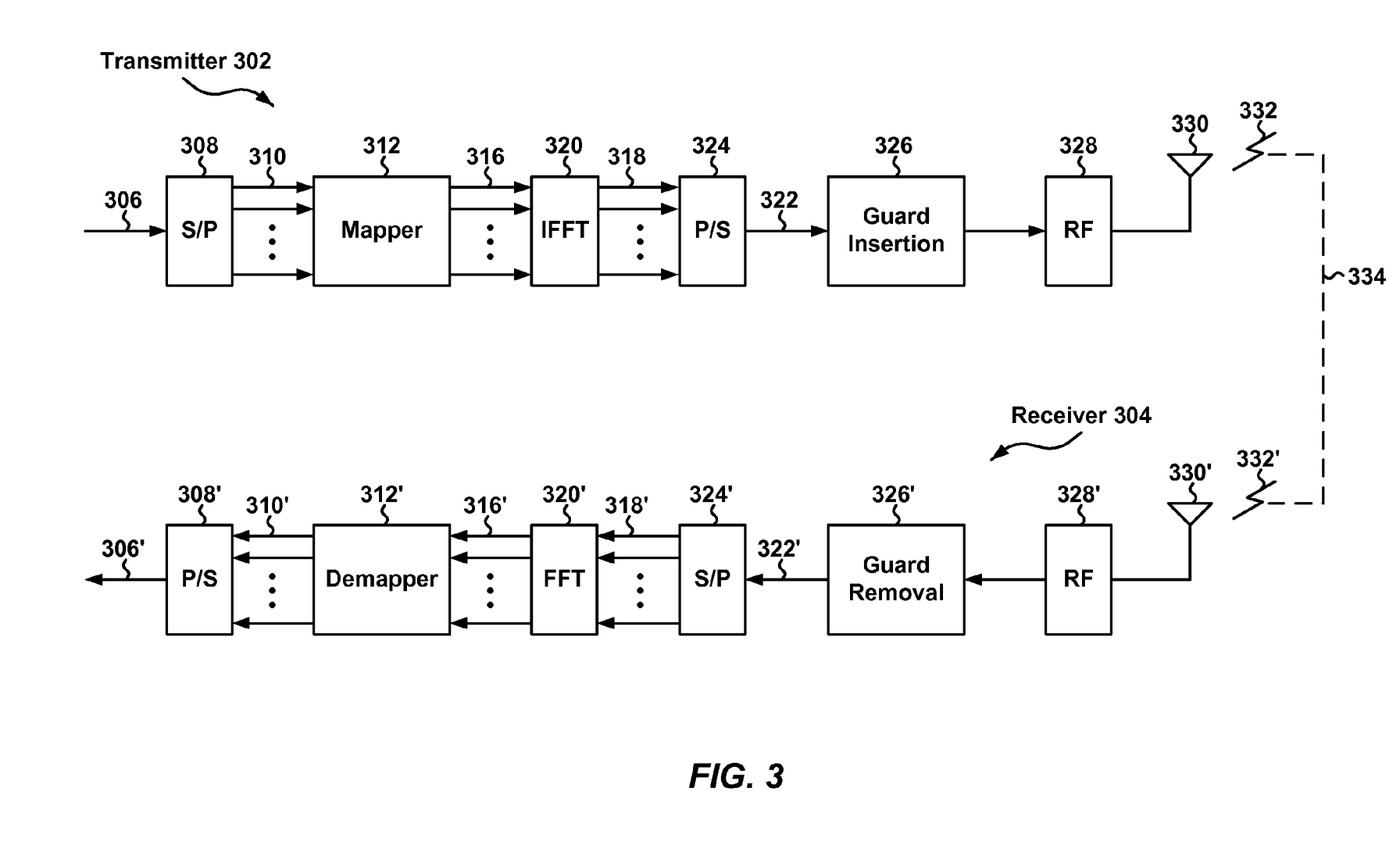
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments described herein.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a BS 104 for transmitting data 306 to a user terminal 106 on a downlink 108. The transmitter 302 may also be implemented in a user terminal 106 for transmitting data 306 to a BS 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to N.sub.cp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a BS 104 on a downlink 108. The receiver 304 may also be implemented in a BS 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor.

Figure 4:
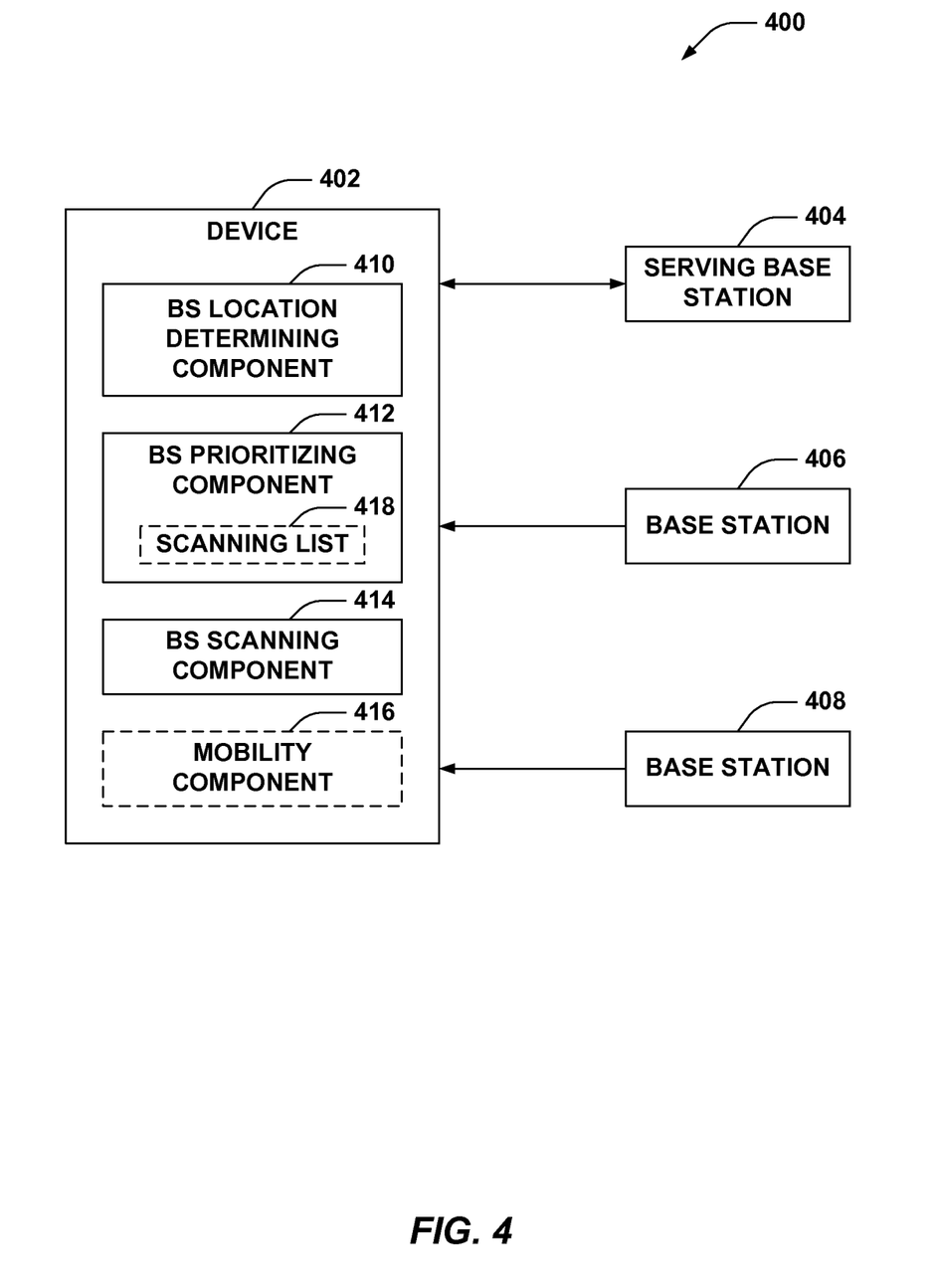
FIG. 4 illustrates a block diagram of an example system for scanning base stations based on location.

Referring to FIG. 4, a wireless communication system 400 is illustrated that facilitates determining an order for scanning surrounding BSs or related cells. Though functionality herein is described in terms of BSs, it is to be appreciated that concepts can apply to cells of the BSs in addition or alternatively. System 400 can include a device 402 that communicates with a serving BS 404 to access a wireless network. System 400 also includes one or more surrounding BSs, such as BS 406 and 408, from which device 402 can receive one or more signals (e.g., during a scanning interval). Device 402 can be a UE, modem (or other tethered device), a portion thereof, and/or the like. Serving BS 404 and BSs 406 and 408 can each be a macrocell BS, a femtocell BS, a picocell BS, a relay node, a mobile BS, a device (e.g., communicating in peer-to-peer or ad-hoc mode with device 402), a portion thereof, and/or the like.

Device 402 can include a BS location determining component 410 for obtaining a location of one or more BSs or related cells, a BS prioritizing component 412 for ordering the one or more BSs according to location, a BS scanning component 414 for scanning frequencies of the BSs to receive signals therefrom, and/or an optional mobility component 416 for performing a mobility procedure based in part on the scanned signals.

According to an example, device 402 can negotiate scanning intervals with serving BS 404 over which device 402 can scan other BSs (e.g., for mobility or other purposes). BS location determining component 410 can obtain a location of one or more BSs to enhance scanning, as described herein. For example, BS location determining component 410 can determine location of one or more BSs based in part on one or more signals received therefrom, such as a location based service advertisement (LBS-ADV) in WiMAX or a similar signal. In another example, BS location determining component 410 can receive locations of one or more BSs from a core network, from one or more other devices, and/or the like. The determined or obtained BS locations can include an absolute location (e.g., latitude/longitude coordinates) and/or a relative position (e.g., a distance from the device 402, from the serving BS 404, and/or one or more other reference points), which can be given as an (x, y) coordinate, where x is a distance east, and y is a distance north.

Where BS location determining component 410 receives an absolute location, for example, a two-dimensional coordinate representing the location can be computed. For example, given latitude and longitude, the BS location determining component 410 can compute:

$$(x,y)=(R*\cos(\text{latitude})*\text{longitude}*\pi/180, R*\text{latitude}*\pi/180)$$

where R can be the radius of the earth (e.g., 6378 kilometers). In any case, BS location determining component 410 can compute a distance to a BS from the device or other reference point.

In one example, where the current location of the device 402 is not known or where a relative position of surrounding BS(s) 406 and/or 408 are obtained, BS location determining component 410 can compute a distance to a surrounding BS 406 or 408 according to the following formula:

$$d=\sqrt{(x-x_0)^2+(y-y_0)^2}$$

where (x, y) is the coordinate of a surrounding BS 406 or 408, and $(x_0, y_0)$ is the coordinate of the reference point, which can be a location of serving BS 404 in this example. In another example, where the current location of the device 402 is known, and BS location determining component 410 obtains an absolute location for the surrounding BSs 406 and 408, BS location determining component 410 can utilize the locations to determine the distance between device 402, as the reference point, and surrounding BSs 406 and/or 408. In an example, BS location determining component 410 can obtain the location of device 402 from a GPS receiver (not shown), from one or more triangulation schemes (e.g., observed time difference of arrival (OTDOA) and/or the like) or other device-assisted position determination procedures, etc.

In either example, BS location determining component 410 can compute the distance for substantially all surrounding BSs in a neighbor advertisement (NBR-ADV) message in WiMAX with a known location in LBS-ADV. BS prioritizing component 412 can prioritize or otherwise order the BSs based on the distance computed between each surrounding BS 406 or 408 and the serving BS 404, as described. For example, BS prioritizing component 412 can order the BSs in a scanning list 418. In addition, if a BS in NBR-ADV does not have a location in the LBS-ADV, BS prioritizing component 412 can order the BS at the end of the scanning list 418.

BS scanning component 414 can scan BSs in order of distance. In one example, BS scanning component 414 can obtain a scanning list 418 from BS prioritizing component 412, and can scan the BSs in the scanning list 418 according to an order thereof. In another example, BS prioritizing component 412 can continually specify BSs to be scanned to the BS scanning component 414 in order of distance. Other implementations are possible that can cause the BS scanning component 414 to scan the BSs in order of distance to the device 402 or other reference point (e.g., serving BS 404). Further, for example, the BSs measured by BS location determining component 410—e.g., BSs 406 and 408—can be of multiple radio access technologies (RAT) and/or can operate on a different operating frequency than serving BS 404.

Moreover, for example, BS scanning component 414 can scan the ordered BSs 406 or 408, etc. according to one or more stopping criteria that specify a termination event for the scanning. For example, BS scanning component 414 can scan the ordered BSs until k neighbor BSs being scanned have better signal strength than serving BS 404 by a relative margin, where k≥1. For example, the signal strength can correspond to a received signal strength indicator (RSSI), carrier-to-interference-and-noise ratio (CINR), or other measurements performed of the serving BS 404 and other BSs 406 or 408, and the BS scanning component 414 can compare the signal strength to that of the serving BS 404 to determine whether to cease scanning. Moreover, k can be set according to a hardcoding or configured value, observed values of k that result in desired behavior, and/or the like.

In another example, BS scanning component 414 can scan the ordered BSs until a distance of a next surrounding BS to be scanned is larger than a threshold distance. For example, the threshold distance can relate to a distance at which the BS is unlikely to be a mobility candidate for device 402, and can be set according to one or more hardcoded or configured parameters, an observed parameter regarding distances of previous BSs selected for mobility, etc. Thus, BS scanning component 414 can compare computed distance of a BS to a threshold, and when the BS has a distance that achieves or exceeds the threshold distance, BS scanning component 414 can cease scanning remaining BSs (and/or at least not scan the BS). In another example, it is to be appreciated that BS prioritizing component 412 and/or BS location determining component 410 can exclude BSs from the list that have a computed distance exceeding the threshold.

In yet another example, BS scanning component 414 can scan ordered BSs until m surrounding BSs being scanned have signal strength below a threshold, where m≥1. Similarly, the threshold can be set to indicate the BS is not a likely mobility candidate based on a hardcoded or configured parameter, an observed signal strength of previous selected BSs, and/or the like. In this example, BS scanning component 414 can determine the signal strength of a BS from one or more corresponding scanned signals, and can compare the signal strength to the threshold to determine whether to cease scanning. Moreover, m can be set according to a hardcoding or configured value, observed values of m that result in desired behavior, and/or the like.

In any case, mobility component 416 can perform a mobility procedure to handover communications of device 402 from serving BS 404 to one or more other scanned BSs 406 or 408. For example, this can include communicating a measurement report to the serving BS 404 that specifies a signal strength of the surrounding BSs 406 or 408 measured during scanning, communicating a handover command to the serving BS 404 based on the observed signal strengths (e.g., as compared to a signal strength of serving BS 404), and/or the like.

Figure 5:
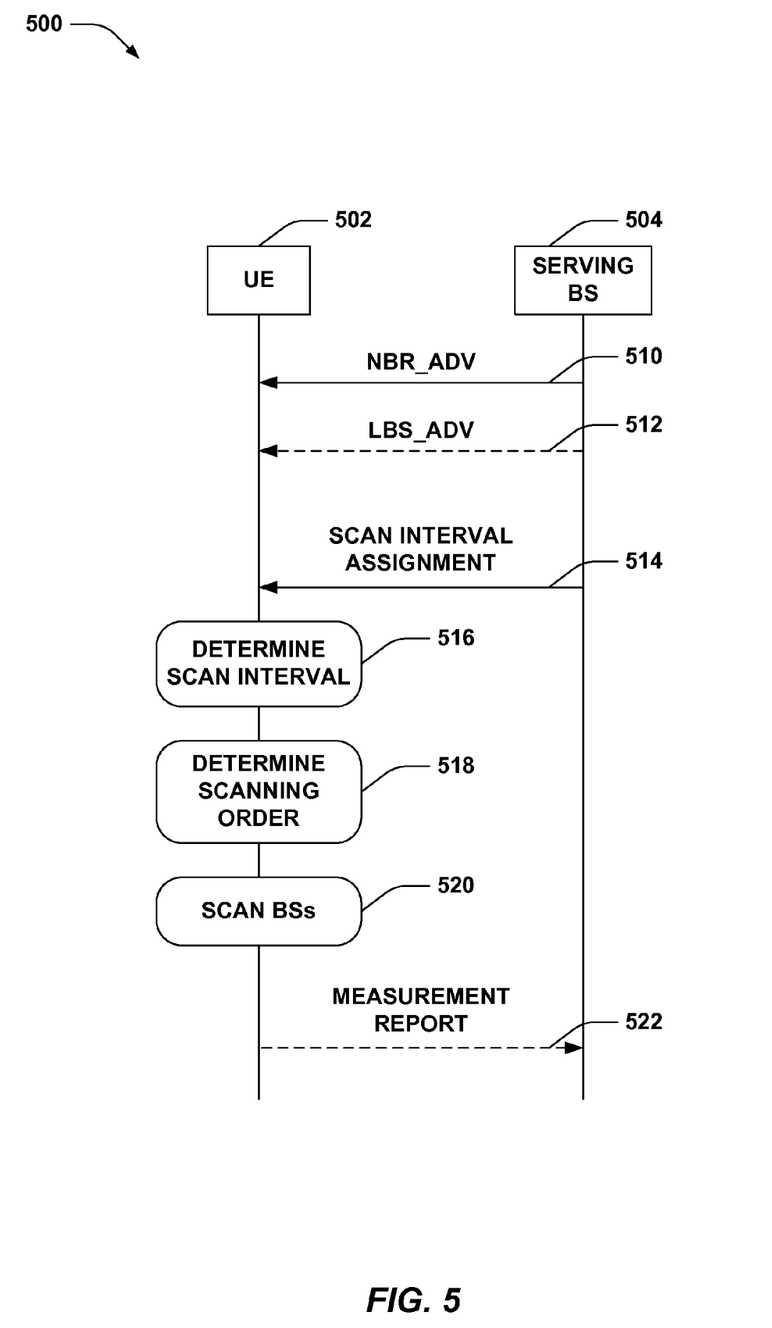
FIG. 5 illustrates a block diagram of an example system for scanning base stations based on one or more WiMAX messages.

Turning to FIG. 5, an example system 500 is illustrated for scanning BSs during a scanning interval in WiMAX. System 500 includes a UE 502 that communicates with a serving BS 504 to receive wireless network access, as described herein. Serving BS 504 can transmit a NBR_ADV 510 that identifies, or at least comprises information for identifying, one or more surrounding cells or related BSs. UE 502 can receive the NBR_ADV 510 and can identify the one or more surrounding cells or BSs. UE 502 can also obtain a location of the serving BS 504 and/or the surrounding cells or BSs, which can be based at least in part on a LBS_ADV 512 received from serving BS 504. In addition, UE 502 can receive a scan interval assignment 514 from serving BS 504. This can occur upon initializing a connection with the serving BS 504 and/or at substantially any time.

UE 502 can determine the scan interval beginning at 516, and can determine a scanning order for one or more BSs at 518. For example, the scanning order can be determined at 518 based on computing distances to the serving BS 504 and/or surrounding cells or BSs using the obtained locations. In one example, where the UE 502 knows its location, the UE 502 can compute the distance based on the location of the UE 502 and the respective BS or cell. Where the UE 502 does not know its location, UE 502 can determine the distance of the BSs relative to the location of serving BS 504, as described. In any case, at 520, UE 502 can scan at least some of the BSs according to the scanning order. UE 502 can also optionally provide a measurement report 522 to serving BS 504 (e.g., or can perform a different mobility action) based on the scanning.

Figure 6:
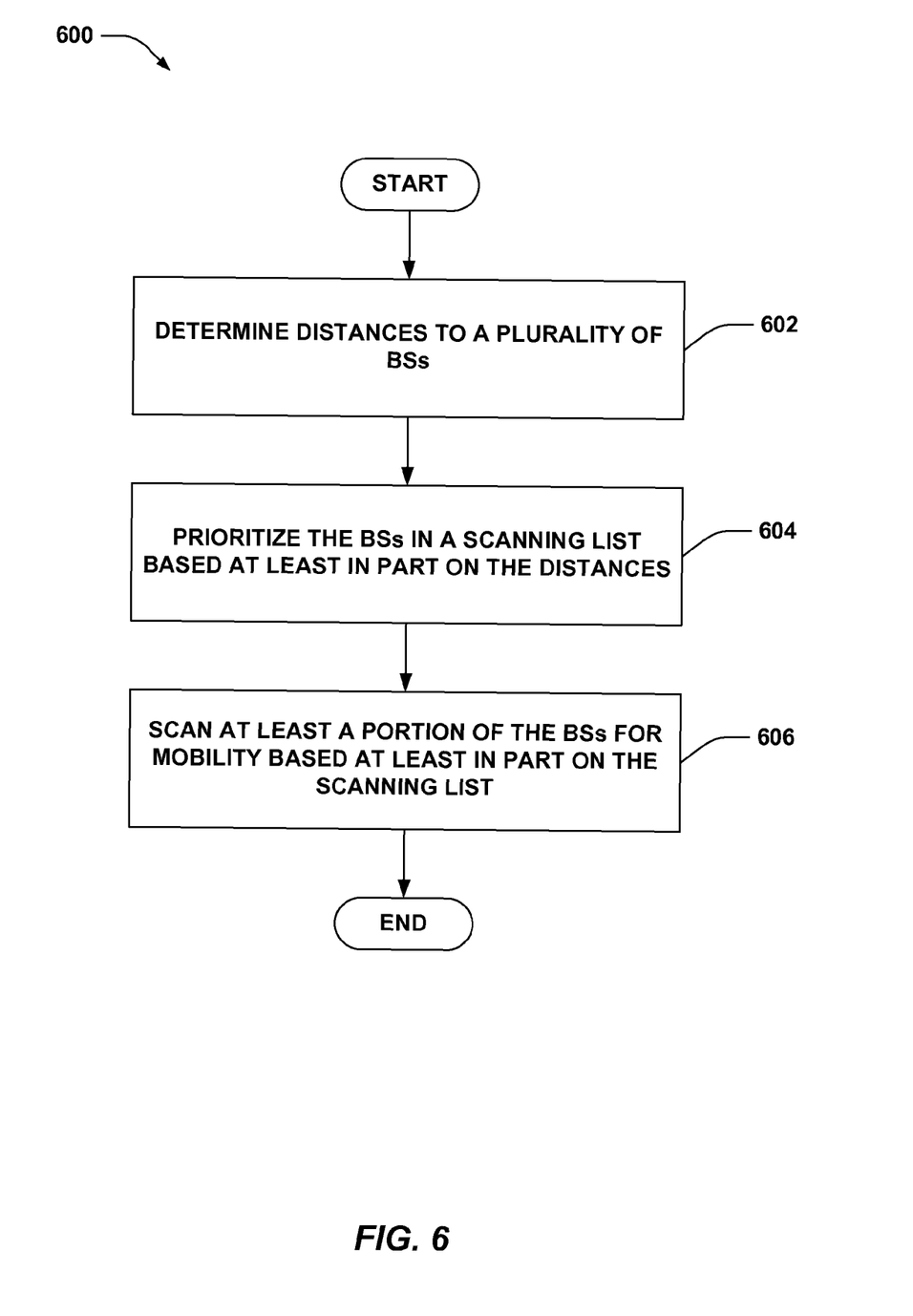
FIG. 6 is a flow chart of an aspect of a methodology for scanning base stations.
Figure 7:
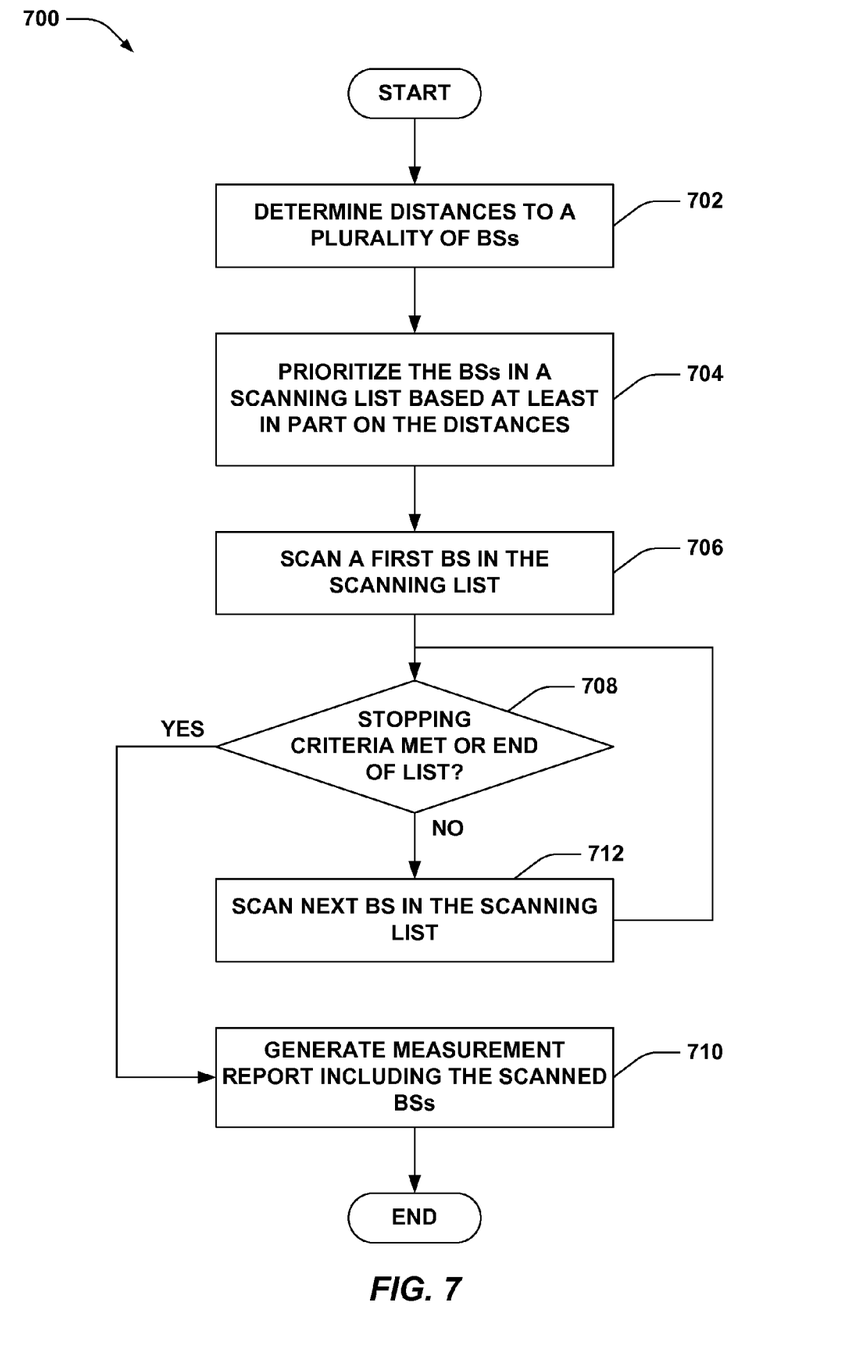
FIG. 7 is a flow chart of an aspect of a methodology for scanning a portion of base stations according to whether stopping criteria are met.

Referring to FIGS. 6-7, example methodologies relating to scanning BSs are illustrated. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Turning to FIG. 6, an example methodology 600 for scanning BSs is illustrated.

At 602, distances to a plurality of BSs can be determined. For example, this can include receiving location information regarding the plurality of BSs, and computing the distance based on the location information as compared to a reference point. The location information, for example, can comprise an absolute or relative location of the plurality of BSs and/or can be received in one or more messages from the plurality of BSs, from a core network, and/or the like. Moreover, the reference point can be a device location, if known, a location of a serving BS, and/or the like.

At 604, the BSs can be prioritized in a scanning list based at least in part on the distances. In an example, the BSs can be prioritized such that BSs of a shorter distance can be measured first. This allows for more efficient scanning since the BSs of shorter distance can use less scanning time (e.g., since signals can be received more efficiently than from BSs of longer distance).

At 606, at least a portion of the BSs can be scanned for mobility based at least in part on the scanning list. Thus, as described, BSs in the first positions of the list can be of shortest distance, and can be scanned first. In addition, scanning can be ceased, as described, after one or more stopping criteria to avoid scanning BSs that are not candidates for mobility. This also increases efficiency of the scanning Also, scanning can occur during one or more assigned scanning intervals, which can be bounded in time. Thus, scanning BSs that are of shorter distance can ensure higher quality scanning in the allotted scanning interval where the scanning interval is not sufficient for measuring all surrounding BSs. In addition, the BSs can operate on different frequencies and/or according to different RATs, thus a receiver can be tuned to other frequencies during the scanning interval. Therefore, ceasing scanning before all base stations are scanned can conserve additional resources associated with such tuning.

Referring to FIG. 7, an example methodology 700 is shown for scanning BSs.

At 702, distances to a plurality of BSs can be determined. For example, this can include receiving location information regarding the plurality of BSs, and computing the distance based on the location information as compared to a reference point. The location information, for example, can comprise an absolute or relative location of the plurality of BSs and/or can be received in one or more messages from the plurality of BSs, from a core network, and/or the like. Moreover, the reference point can be a device location, if known, a location of a serving BS, and/or the like. At 704, the BSs can be prioritized in a scanning list based at least in part on the distances. In an example, the BSs can be prioritized such that BSs of a shorter distance can be measured first. This allows for more efficient scanning since the BSs of shorter distance can use less scanning time (e.g., since signals are received more efficiently than from BSs of longer distance).

At 706, a first BS in the scanning list can be scanned. In an example, the BSs can operate on different frequencies and/or according to different RATs, thus a receiver can be tuned to other frequencies for scanning the first BS. At 708, it can be determined whether a stopping criteria is met or whether the end of the scanning list is encountered. For example, the stopping criteria can relate to determining a number of the BSs having a signal strength over that of the serving BS at least by a relative margin, determining that one of the distances of the BSs is over a threshold distance, determining a number of the plurality of the BSs have a signal strength less than a threshold signal strength, and/or the like. Once the stopping criteria is met, a measurement report including the scanned BSs can be generated at 710. If the stopping criteria is not met, a next BS in the scanning list can be scanned at 712, and the determination can be made again at 708.

It will be appreciated that, in accordance with one or more aspects described herein, inferences can be made regarding determining distances to the BSs, determining whether stopping criteria have been met, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
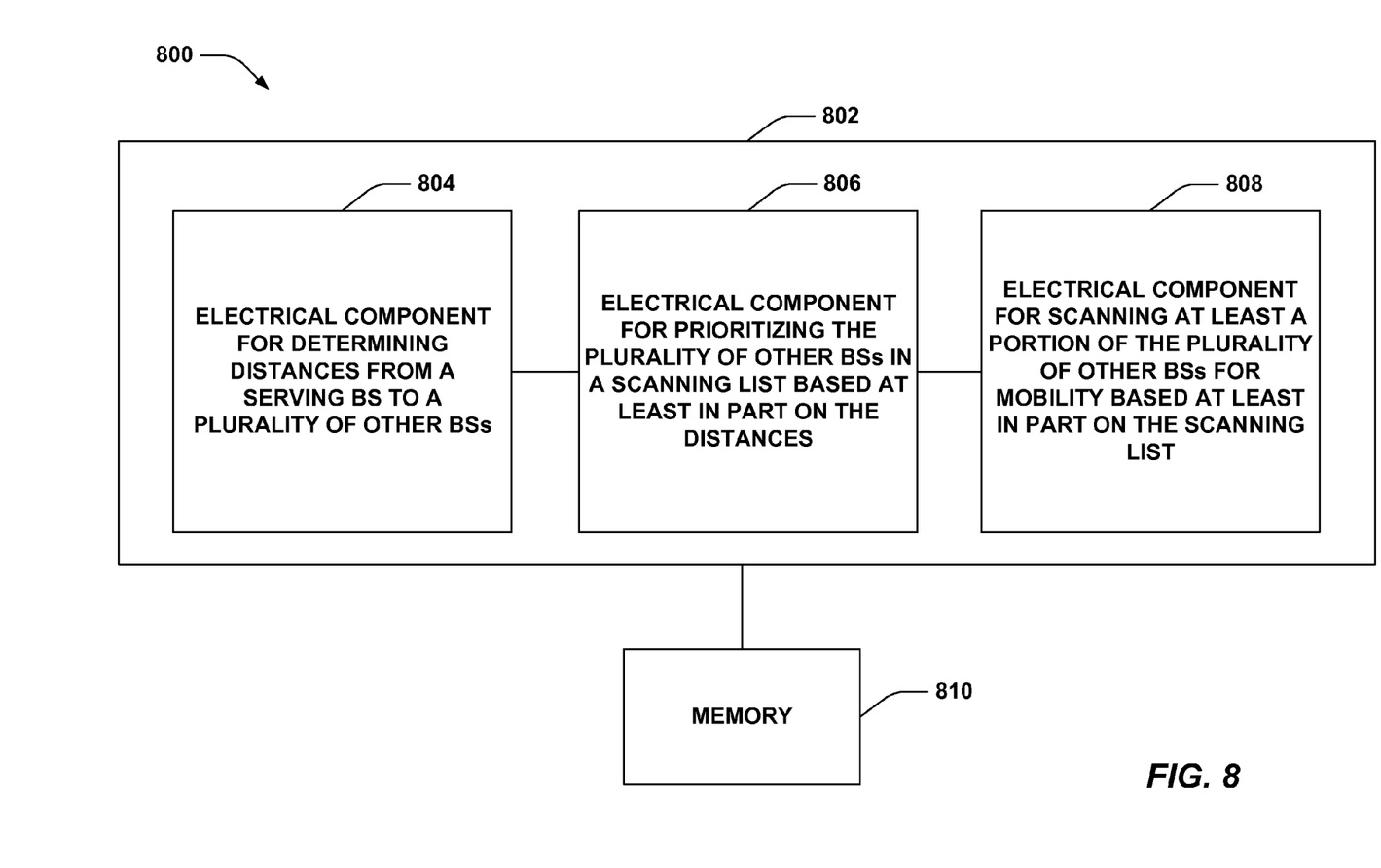
FIG. 8 is a block diagram of an aspect of a system that scans base stations.

With reference to FIG. 8, illustrated is a system 800 that scans BSs in wireless communications. For example, system 800 can reside at least partially within a device. It is to be appreciated that system 800 is represented as including functional blocks, which can be functional blocks that represent functions implemented by a processor, software, firmware, or combinations thereof. System 800 includes a logical grouping 802 of components (e.g., electrical components) that can act in conjunction. For instance, logical grouping 802 can include an electrical component for determining distances from a serving BS to a plurality of other BSs 804. This can be based on absolute locations received for the serving BS or other BSs, as described. Further, logical grouping 802 can comprise an electrical component for prioritizing the plurality of other BSs in a scanning list based at least in part on the distances 806. This can include prioritizing shorter distance BSs before other BSs.

In addition, logical grouping 802 can also comprise an electrical component for scanning at least a portion of the plurality of other BSs for mobility based at least in part on the scanning list 808. Scanning can include scanning BSs over other operating frequencies and/or using other RATs. In addition, electrical component 808 can cease scanning a remaining portion of the BSs according to stopping criteria, as described. For example, electrical component 804 can include a BS location determining component 410, as described above. In addition, for example, electrical component 806, in an aspect, can include a BS prioritizing component 412, as described above. Moreover, electrical component 808 can include a BS scanning component 414, for example.

Additionally, system 800 can include a memory 810 that retains instructions for executing functions associated with the electrical components 804, 806, and 808. While shown as being external to memory 810, it is to be understood that one or more of the electrical components 804, 806, and 808 can exist within memory 810. In one example, electrical components 804, 806, and 808 can comprise at least one processor, or each electrical component 804, 806, and 808 can be a corresponding module of at least one processor. Moreover, in an additional or alternative example, components 804, 806, and 808 can be a computer program product comprising a computer readable medium, where each component 804, 806, and 808 can be corresponding code.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for measuring base stations in wireless communications, comprising:
   computing a distance from a serving base station to each of a plurality of other base stations;
   prioritizing the plurality of other base stations in a prioritized scanning list based at least in part on the computed distances; and
   scanning the plurality of other base stations according to an order provided by the prioritized scanning list until one or more criteria are met that terminate the scanning before each of the base stations in the prioritized scanning list is scanned.

2. The method of claim 1, wherein the computing of the distances is based at least in part on an absolute location of the plurality of other base stations and the serving base station.

3. The method of claim 1, further comprising determining that the one or more criteria have been met when a specified number of the base stations scanned have a signal strength greater than that of the serving base station at least by a relative margin.

4. The method of claim 1, further comprising determining that the one or more criteria have been met when the computed distance of a next base station to be scanned according to the order provided by the prioritized scanning list is greater than a threshold distance.

5. The method of claim 1, further comprising determining that the one or more criteria have been met when a specified number of the base stations scanned have a signal strength smaller than a threshold signal strength.

6. An apparatus for measuring base stations in wireless communications, comprising:
   at least one processor configured to:
      compute a distance from a serving base station to each of a plurality of other base stations;
      prioritize the plurality of other base stations in a prioritized scanning list based at least in part on the computed distances; and
      scan the plurality of other base stations according to an order provided by the prioritized scanning list until one or more criteria are met that terminate the scanning before each of the base stations in the prioritized scanning list is scanned; and
   a memory coupled to the at least one processor.

7. The apparatus of claim 6, wherein the at least one processor is configured to compute the distances based at least in part on an absolute location of the plurality of other base stations and the serving base station.

8. The apparatus of claim 6, wherein the at least one processor is configured to determine that the one or more criteria have been met when a specified number of the base stations scanned have a signal strength greater than that of the serving base station at least by a relative margin.

9. The apparatus of claim 6, wherein the at least one processor is configured to determine that the one or more criteria have been met when the computed distance of a next base station to be scanned according to the order provided by the prioritized scanning list is greater than a threshold distance.

10. The apparatus of claim 6, wherein the at least one processor is configured to determine that the one or more criteria have been met when a specified number of the base stations scanned have a signal strength smaller than a threshold signal strength.

11. An apparatus for measuring base stations in wireless communications, comprising:
   means for computing a distance from a serving base station to a plurality of other base stations;
   means for prioritizing the plurality of other base stations in a prioritized scanning list based at least in part on the computed distances; and
   means for scanning the plurality of other base stations according to an order provided by the prioritized scanning list until one or more criteria are met that terminate the scanning before each of the base stations in the prioritized scanning list is scanned.

12. The apparatus of claim 11, wherein the means for computing computes the distances based at least in part on an absolute location of the plurality of other base stations and the serving base station.

13. The apparatus of claim 11, wherein the means for scanning comprises means for determining that the one or more criteria have been met when a specified number of the base stations scanned have a signal strength greater than that of the serving base station at least by a relative margin.

14. The apparatus of claim 11, wherein the means for scanning comprises means for determining that the one or more criteria have been met when the computed distance of a next base station to be scanned according to the order provided by the prioritized scanning list is greater than a threshold distance.

15. The apparatus of claim 11, wherein the means for scanning comprises means for determining that a specified number of the base stations scanned have a signal strength smaller than a threshold signal strength.

16. A computer program product, comprising:
a non-transitory computer-readable medium, comprising:
code for causing at least one computer to compute a distance from a serving base station to each of a plurality of other base stations;
code for causing the at least one computer to prioritize the plurality of other base stations in a prioritized scanning list based at least in part on the computed distances; and
code for causing the at least one computer to scan the plurality of other base stations according to an order provided by the prioritized scanning list until one or more criteria are met that terminate the scanning before each of the base stations in the prioritized scanning list is scanned.

17. The computer program product of claim 16, wherein the code for causing the at least one computer to compute the distances determines those distances based at least in part on an absolute location of the plurality of other base stations and the serving base station.

18. The computer program product of claim 16, wherein the non-transitory computer-readable medium further comprises code for causing the at least one computer to determine that the one or more criteria have been met when a specified number of the base stations scanned have a signal strength greater than that of the serving base station at least by a relative margin.

19. The computer program product of claim 16, wherein the non-transitory computer-readable medium further comprises code for causing the at least one computer to determine that the one or more criteria have been met when the computed distance of a next base station to be scanned according to the order provided by the prioritized scanning list is greater than a threshold distance.

20. The computer program product of claim 16, wherein the non-transitory computer-readable medium further comprises code for causing the at least one computer to determine that the one or more criteria have been met when a specified number of the base stations scanned have a signal strength smaller than a threshold signal strength.

21. An apparatus for measuring base stations in wireless communications, comprising:
a base station location determining component configured to compute a distance from a serving base station to each of a plurality of other base stations;
a base station prioritizing component configured to prioritize the plurality of other base stations in a prioritized scanning list based at least in part on the computed distances; and
a base station scanning component configured to scan the plurality of other base stations according to an order provided in the prioritized scanning list until one or more criteria are met that terminate the scanning before each of the base stations in the prioritized scanning list is scanned.

22. The apparatus of claim 21, wherein the base station location determining component is configured to compute the distances based at least in part on an absolute location of the plurality of other base stations and the serving base station.

23. The apparatus of claim 21, wherein the base station scanning component is further configured to determine that the one or more criteria are met when a specified number of the base stations scanned have a signal strength greater than that of the serving base station at least by a relative margin.

24. The apparatus of claim 21, wherein the base station scanning component is further configured to determine that the one or more criteria are met when the computed distance of a next base station to be scanned according to the order provided by the prioritized scanning list is greater than a threshold distance.

25. The apparatus of claim 21, wherein the base station scanning component is further configured to determine that the one or more criteria are met when a specified number of the base stations scanned have a signal strength smaller than a threshold signal strength.

26. The method of claim 1, further comprising generating a measurement report of the base stations in the prioritized scanning list that are scanned before the one or more criteria are met that terminate the scanning before each of the base stations in the prioritized scanning list is scanned.

27. The apparatus of claim 6, wherein the at least one processor is configured to generate a measurement report of the base stations in the prioritized scanning list that are scanned before the one or more criteria are met that terminate the scanning.

28. The apparatus of claim 11, wherein the means for scanning comprises means for generating a measurement report of the base stations in the prioritized scanning list that are scanned before the one or more criteria are met that terminate the scanning.

29. The computer program product of claim 16, wherein the non-transitory computer-readable medium further comprises code for causing the at least one computer to generate a measurement report of the base stations in the prioritized scanning list that are scanned before the one or more criteria are met that terminate the scanning.

30. The apparatus of claim 21, wherein the base station scanning component is further configured to generate measurement report of the base stations in the prioritized scanning list that are scanned before the one or more criteria are met that terminate the scanning.

* * * * *